UNITED STATES PATENT OFFICE.

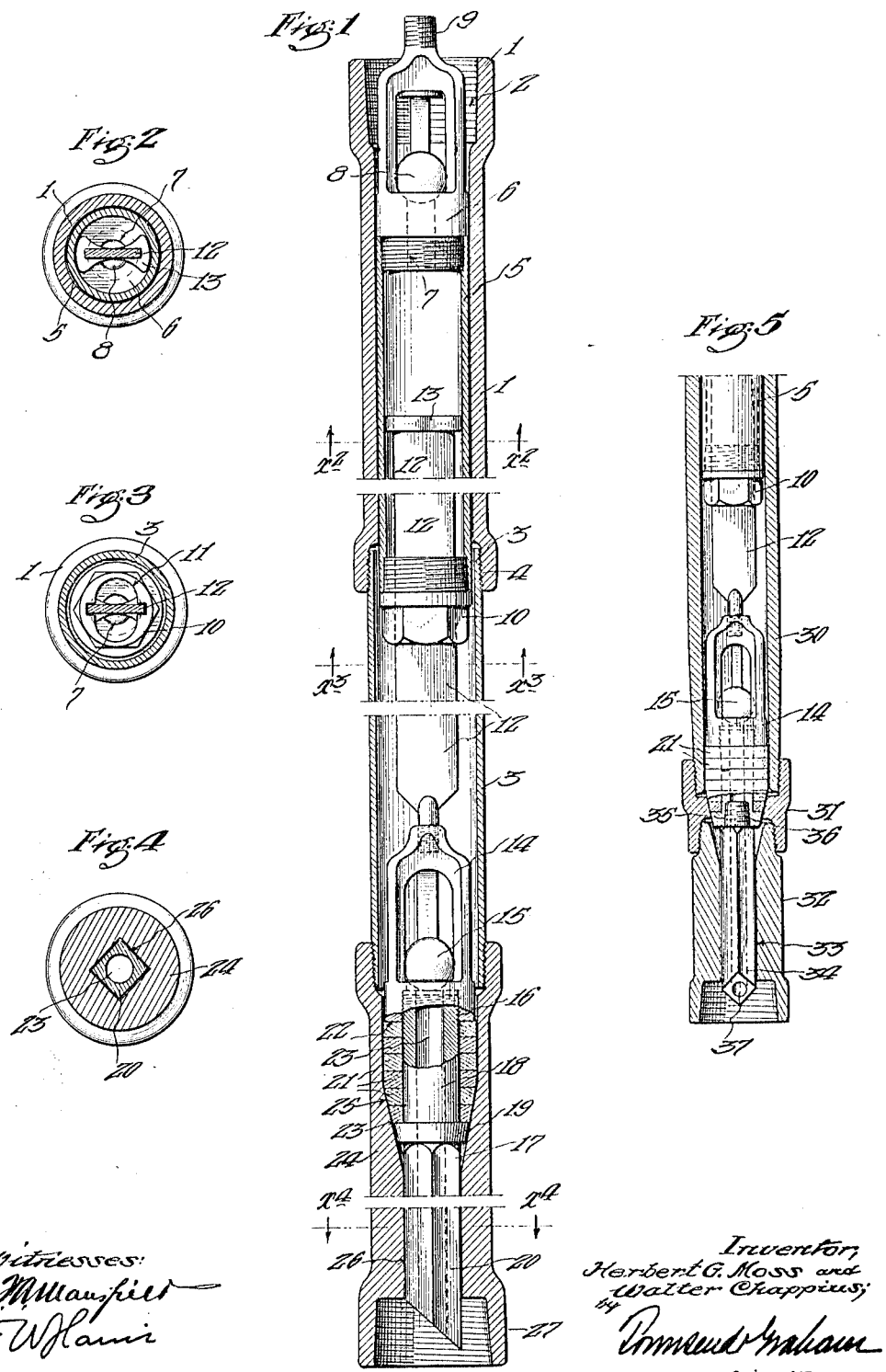

HERBERT G. MOSS AND WALTER CHAPPIUS, OF MARICOPA, CALIFORNIA.

PUMP.

1,089,720.  Specification of Letters Patent.  Patented Mar. 10, 1914.

Application filed June 2, 1913. Serial No. 771,353.

*To all whom it may concern:*

Be it known that we, HERBERT G. Moss and WALTER CHAPPIUS, both citizens of the United States, residing at Maricopa, in the county of Kern and State of California, have invented a new and useful Pump, of which the following is a specification.

Our invention relates to pumps and particularly to those adapted to operate in deep wells. In pumps of this character the valves are ordinarily arranged so that they may be lifted from the well and readily separated for purposes of repair. When operating, however, it is essential that they be prevented from so separating, and the principal object of our invention is to provide a construction that will permit a ready separation of the valves outside the well and at the same time prevent accidental separation when in operation.

Other objects and advantages will appear from the following specification.

Referring to the drawings, which are for illustrative purposes only: Figure 1 is a sectional elevation of our invention. Fig. 2 is a sectional plan on the line $x^2$—$x^2$ in Fig. 1 looking in the direction of the arrows. Fig. 3 is a sectional plan on the line $x^3$—$x^3$ of Fig. 1 looking in the direction of the arrows. Fig. 4 is a sectional plan on the line $x^4$—$x^4$ of Fig. 1 looking in the direction of the arrows. Fig. 5 is a sectional plan of an alternative form of our invention.

In the drawings, 1 is a pump barrel adapted to screw into the casing of the well, not shown, at its upper end 2 and into the extension 3 at its lower end 4. This barrel 1 is preferably made of wrought steel and is machined out to fit a plunger 5 which is screwed to and carried by an upper cage 6 which has an opening 7 therein closed by a ball 8. The upper cage 6 is provided with a connection 9 for the attachment of the pump rod not shown.

The lower end of the plunger 5 is threaded to receive the lower plunger nut 10. Sliding loosely in an opening 11 in this nut 10 is a lifting rod 12 provided with a head 13. The opening 11 is of such shape that the liquid to be pumped can flow freely by the rod 12 as shown in Fig. 3, but the rod is restrained from turning.

The lower end of the lifting rod 12 is secured to a lower cage 14 which incloses a ball 15. This cage 14 has a threaded opening 16 into which is screwed a stem 17. The stem 17 has an upper cylindrical portion 18, a central annular portion 19, and a squared extension 20. Leather washers 21 are clamped between the annular portion 19 and the lower face 22 of the lower lifting cage 14. The stem 17 has an opening 23 therein on the upper edge of which the ball 15 seats.

Screwed firmly to the lower end of the extension 3 is a lower cage seat 24 preferably formed of wrought steel and having a conical seat 25 engaged by the leather washers 21. The lower cage seat 24 has a square opening 26 into which fits the squared extension 20. The lower end 27 of the lower cage seat 24 is threaded to receive a well casing not shown.

In the alternative form shown in Fig. 5 we employ a plunger 5 and parts upon the upper end thereof as in Fig. 1. We also use a lifting rod 12 passing through an opening in the lower plunger nut 10 as in Fig. 1. In place, however, of using an extension 3 threaded into the pump barrel 1 we use an extended pump barrel 30 and fasten a lower cage seat 31 to the pump barrel 30. We can further utilize existing lower cage seats 31 of the form shown in Fig. 5 by screwing a fitting 32 into the lower end thereof. This fitting 32 is provided with a square hole 33 for receiving an extension 34. This extension 34 may be made integral with the stem as in Fig. 1, or it may screw into a stem 35 at 36 as shown in Fig. 5. In either case an opening 37 is provided therein.

The method of operation of either form is the same. Referring to the form shown in Fig. 1 a casing, not shown, being screwed in the pump barrel 1 at the upper end thereof and into the lower cage seat 24 at the lower end thereof, the lower cage seat 24, the extension 3 and the pump barrel 1 are stationary. The lower cage 14 is firmly seated in the lower cage seat 24. The pump rod, not shown, attached to the connection 9 being reciprocated, the plunger 5 is reciprocated. On the down stroke liquid passes upwardly through the upper cage 6, the ball 8 being lifted from its seat on the opening 7 to allow of this passage. The ball 15 meanwhile closes the opening 23. When the plunger 5 reverses its motion, the ball 8 seats and the ball 15 lifts. The extension 20 is made sufficiently long so that it is never entirely withdrawn from the square hole in the lower cage seat 24 during normal operation of the pump. The action is that of the common lifting pump. The parts described above are, however, located at the bottom of a deep casing and it is necessary that some provision be made for removing them for inspection and repair. This is the function of the lifting rod 12. The parts are so proportioned that the lower plunger nut 10 never quite touches the head 13 on the lifting rod 12 during the normal operation of the pump. The lower cage 14 thus remains in position.

When it is desired to lift out both cages the pump rod is pulled up and the head 13 is engaged by the lower plunger nut 10, and the lower cage 14 with its attached parts is withdrawn.

The casing, the extension 3, and the pump barrel 1 may be rigidly fastened together and will not work loose. In a similar manner the plunger 5 and the parts secured thereto may be securely fastened as there is little need for unfastening them. The lower cage 14, however, having leather packing often needs attention and it must be detachably secured to the lifting rod 12. It is to prevent the detachment at this joint that the lifting rod 12 is made flat and the extension 20 is made square, and it is evident that the form of the parts prevent any turning with the consequent detachment.

What we claim is:

1. A pump comprising a pump barrel adapted to be screwed onto the casing of a well, a pipe extension screwed into said pump barrel, a lower cage seat adapted to be screwed onto said pipe extension and having a conical seat therein terminating in a square opening, a hollow plunger sliding in said pump barrel, an upper cage screwed into the upper end of said plunger, having an opening therein in open communication with the interior of said plunger, a ball for closing the opening in said upper cage, a lower cage seating in said lower cage seat and having an opening therein, a ball for closing the opening in said lower cage, a square extension on said lower cage so placed as to enter the aforesaid square opening in said lower cage seat, a flat lifting rod detachably fastened to said lower cage and projecting into said plunger, a nut on the lower end of the plunger through which said lifting rod passes, a head fixed on the end of said lifting rod to prevent the lifting rod from being withdrawn from the plunger by engaging the upper surface of said nut, and means for reciprocating the plunger.

2. A pump comprising a pump barrel adapted to be screwed onto the casing of a well, a lower cage seat screwed onto said pump barrel and having a conical seat therein, an attachment screwed into said lower cage seat and having a square opening therein, a hollow plunger reciprocating in said pump barrel, an upper cage screwed into the upper end of said plunger and having an opening therein in open communication with the interior of said hollow plunger, a ball for closing the opening in said upper cage, a lower cage seating in said lower cage seat and having an opening therein, a ball for closing the opening in said lower cage, a square extension screwed into said lower cage and extending into the square opening in said attachment, a flat lifting rod detachably secured to said lower cage and projecting into said plunger, a lower plunger nut on the lower end of said plunger provided with an opening through which said lifting rod passes, a head fixed on the end of said lifting rod to prevent the lifting rod from being withdrawn from the plunger by engaging the upper surface of said nut, and means for reciprocating the plunger.

3. A pump comprising a hollow structure adapted to be fastened to the casing of a well, said structure terminating in a conical seat having a square opening below, a hollow plunger tightly fitting and reciprocated in said hollow structure, valve means at the upper end of said plunger, a valve detachably fitting into said conical seat in said hollow structure and provided with a square extension fitting into the square opening in said hollow structure, a flat lifting rod detachably secured to said last named valve and extending into said hollow plunger, a head solidly attached to the upper end of said flat lifting rod, a nut on the lower end of said plunger provided with an opening through which said flat lifting rod passes but of insufficient size to permit the passage of said head, and means for reciprocating the plunger.

4. A pump comprising a hollow structure adapted to form a portion of the casing of a well, a plunger having valve means at the upper end thereof fitting tightly and reciprocating in said hollow structure, a valve means seated in the lower end of said hollow structure but restrained from turning therein, a lifting rod detachably secured to said last named valve means slidably secured in said plunger and restrained from turning in said plunger, and means for reciprocating said plunger.

5. A pump comprising a stationary hollow structure forming a portion of the casing of a well, a plunger reciprocating in said structure and provided with valve means, a valve means detachably seated in the lower end of said structure and restrained from turning therein, a lifting rod detachably secured to said last named valve means and slidably secured to said plunger being restrained from turning in said plunger, and means for reciprocating said plunger.

In testimony whereof, we have hereunto set our hands at Maricopa, California, this 26th day of May, 1913.

HERBERT G. MOSS.
WALTER CHAPPIUS.

In presence of—
E. G. Chadsey,
J. H. Gibson.